United States Patent
Komaki

[19]

[11] Patent Number: 5,497,507
[45] Date of Patent: *Mar. 5, 1996

[54] PORTABLE WIRELESS TELEPHONE APPARATUS WITH USE SPECIFIC POWER MONITORING

[75] Inventor: Norio Komaki, Fukuoka, Japan

[73] Assignee: Matsushita Electric Industrial Co., Ltd., Japan

[*] Notice: The term of the patent shall not extend beyond the expiration date of Pat. No. 5,392,462.

[21] Appl. No.: 327,791

[22] Filed: Oct. 20, 1994

Related U.S. Application Data

[63] Continuation-in-part of Ser. No. 945,874, Sep. 17, 1992, Pat. No. 5,392,462.

[30] Foreign Application Priority Data

Sep. 27, 1991 [JP] Japan .................................. 3-248996

[51] Int. Cl.⁶ .......................... H04B 1/40; H04M 11/00
[52] U.S. Cl. ........................ 455/89; 455/127; 455/343; 379/59; 379/61
[58] Field of Search ......................... 455/89, 127, 343; 379/59, 61

[56] References Cited

U.S. PATENT DOCUMENTS

| | | | |
|---|---|---|---|
| 4,989,230 | 1/1991 | Gillig et al. | 379/59 |
| 5,117,449 | 5/1992 | Metroka et al. | 379/58 |
| 5,127,042 | 6/1992 | Gillig et al. | 379/59 |
| 5,392,462 | 2/1995 | Komaki | 455/343 X |

*Primary Examiner*—Chi H. Pham
*Attorney, Agent, or Firm*—Parkhurst, Wendel & Rossi

[57] ABSTRACT

In a portable wireless telephone capable of providing a cellular mode which allows users to place or receive telephone calls through a cellular telephone network and a cordless mode which allows the users to place or receive telephone calls through an associated base unit of a cordless telephone, a battery condition is monitored to check whether or not the battery energy is so lowered that the cellular mode becomes inoperative. An LCD unit displays a warning if the battery energy is lowered down to such a low level. However, a micro computer equipped in this portable wireless telephone allows the users to use this portable wireless telephone as a cordless telephone, as long-as the remaining battery energy is sufficient enough to do so. Accordingly, this portable wireless telephone can be still activated in the cordless mode even if it cannot be no longer used as a cellular telephone.

9 Claims, 9 Drawing Sheets

PORTABLE WIRELESS TELEPHONE APPARATUS WITH USE SPECIFIC POWER MONITORING

This application is a Continuation-in-Part of U.S. patent application Ser. No. 07/945,874 filed Sep. 17, 1992, now U.S. Pat. No. 5,392,462.

BACKGROUND OF THE INVENTION

1. Field of the Invention

The present invention relates to an improved portable wireless telephone (i.e. a walkie Talkie) capable of providing both cellular and cordless telephone services.

2. Description of the Prior Art

Conventionally, cellular mode portable telephones have become popular, which can allow users to place or receive telephone calls at any point throughout a cellular network. On the other hand, cordless telephones have also become popular, which are typically used in the home. The cordless telephone consists of a base unit connected to a user's telephone landline and a wireless portable telephone unit associated with this base unit. Therefore, the cordless telephone enables the user to place a telephone call at any point throughout the home.

A cellular telephone is convenient when the user goes out of the office or the home, since it allows the user to place and receive telephone calls at any point throughout a large metropolitan area. However, the cost of a cellular telephone call is expensive since cellular telephone calls are made by way of expansive cellular base stations and cellular switching equipment.

Furthermore, when the user returns home, the user may want to use a cordless telephone rather than a cellular telephone. In such a case, the user needs to possess both a cellular telephone and a cordless telephone. Since these two telephone are fundamentally different, the ways of their uses are also different and, therefore, it was troublesome to use these different type telephones properly.

In order to resolve such a problem, it has been proposed a wireless portable telephone which is constituted to integrate a cellular telephone and a cordless telephone into one combined telephone and is capable of providing both cellular and cordless telephone services, as disclosed, for example, in Japanese Unexamined Patent Application No. HEI 3-1621 which is originated from the U.S. patent application Ser. No. 249, 041 filed on Sep. 23, 1988 and patented as the U.S. Pat. No. 4,989,230 on Jan. 29, 1991, or in the U.S. Pat. No. 5,127,042 patented on Jun. 30, 1992.

Hereinafter, with reference to FIGS. 4 and 5, a typical conventional portable wireless telephone is explained. A reference numeral 122 denotes a portable wireless telephone unit. A reference numeral 123 denotes a cellular base station in a cellular telephone network. And, a reference numeral 124 denotes a base unit of a cordless telephone.

In the case where the user wants to use this portable wireless telephone unit 122 as a cellular telephone, the user manipulates a mode selecting switch to activate a cellular mode. By the selection of the cellular mode, the portable wireless telephone unit 122 is situated in a condition for waiting a slave signal sent from the cellular base station 123. On the contrary, in such a waiting condition, it is possible for the user to place a telephone call through the cellular telephone network.

Figure 4:
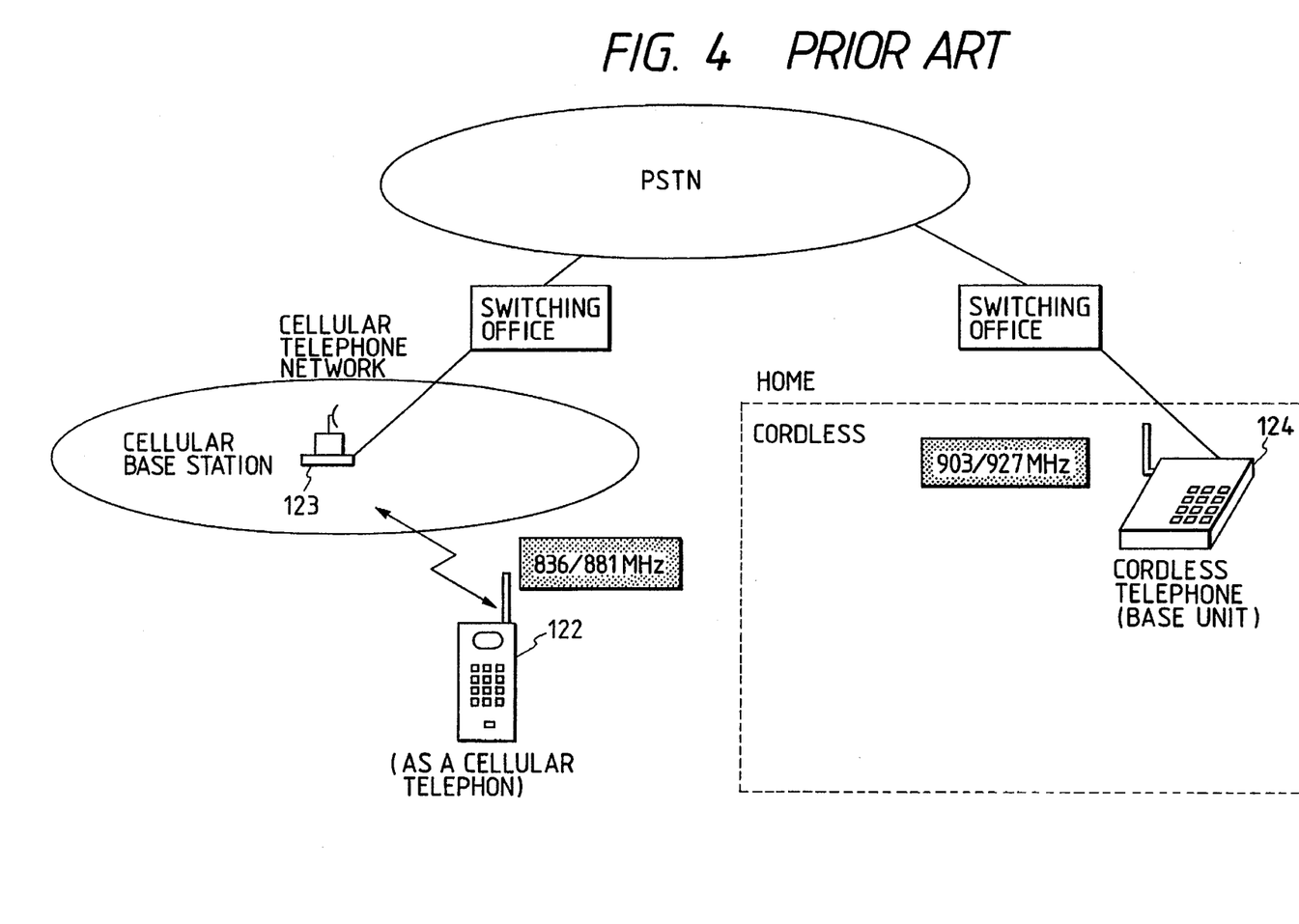
FIG. 4 is an explanatory view illustrating a conventional portable wireless telephone apparatus being used as a cellular telephone.
Figure 5:
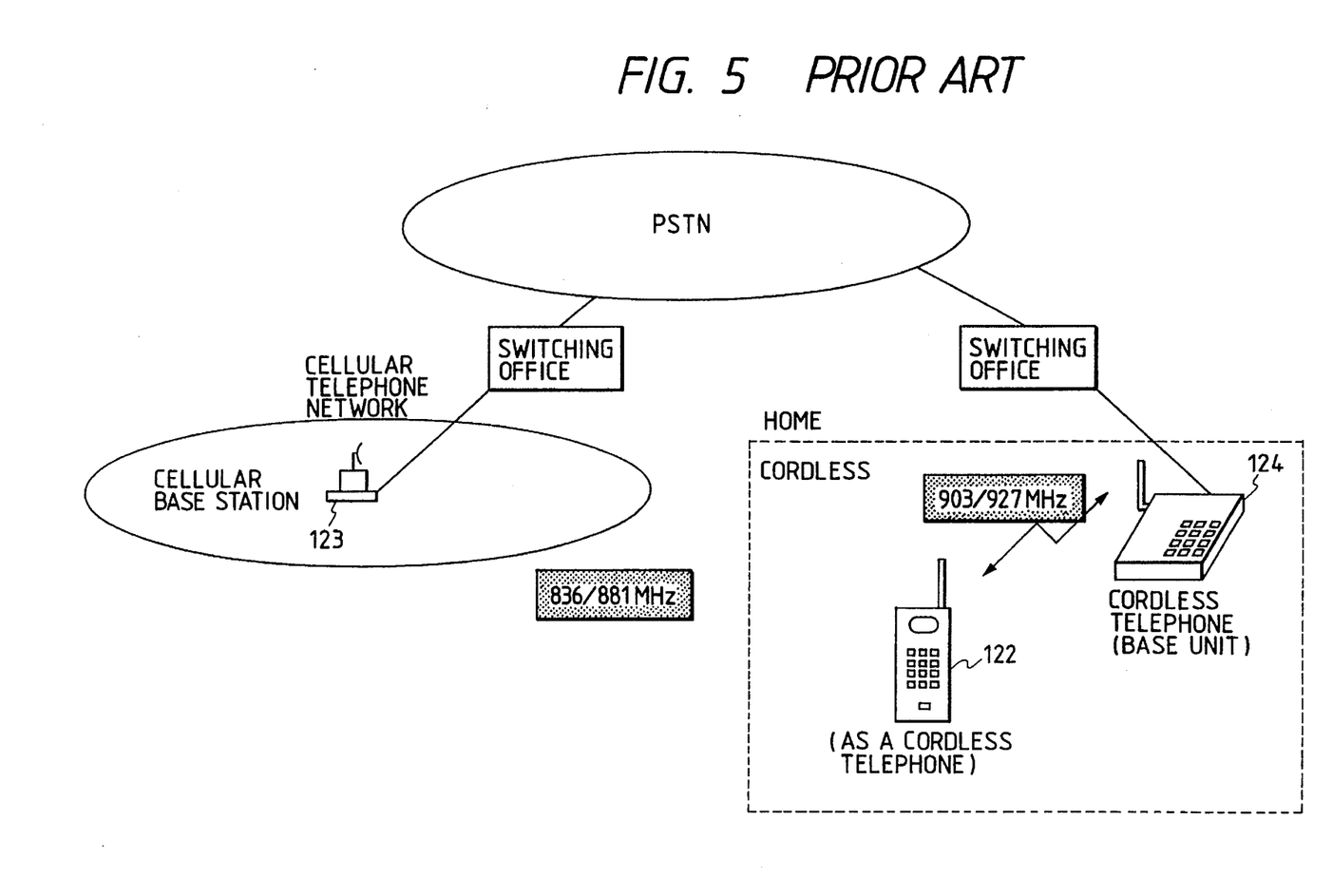
FIG. 5 is an explanatory view illustrating a conventional portable wireless telephone apparatus being used as a portable unit of a cordless telephone.

When the user places a telephone call, or when a telephone call is received, the portable wireless telephone unit 122 is engaged with the cellular base station 123 by way of a cellular radio channel of the cellular telephone network as shown in FIG. 4.

Furthermore, in the case where the user wants to use this portable wireless telephone unit 122 as a cordless telephone, the user manipulates the mode selecting switch to activate a cordless mode. By the selection of the cordless mode, the portable wireless telephone unit 122 is situated in a condition for waiting a slave signal sent from the base unit 124 of the cordless telephone. In such a waiting condition, it is also possible for the user to place a telephone call by manipulating an operational portion such as switches or buttons.

In waiting or calling conditions, a voltage detecting unit provided in the portable wireless telephone unit 122 keeps monitoring a remaining voltage of an installed battery. Therefore, when the voltage detecting unit detects that the battery voltage is decreased down to an inoperative level, a low-voltage detecting signal is outputted. In response to this low-voltage detecting signal, a display unit indicates that the battery voltage is so lowered that an immediate charging operation is required. Furthermore, in a calling condition, a telephone call is forcibly hung up.

However, in the above-described conventional constitution, a service area of a cellular telephone network is generally wider than that of a cordless telephone. An electric power required for transmitting signals or data of the cellular telephone is fairly larger than that of the cordless telephone. Therefore, electric power consumption of the battery become larger in the cellular telephone mode.

A low-voltage detecting level of the voltage detecting unit is set relatively higher for detecting an inoperative level in view of a large electric power consumption in the cellular telephone mode, so that the portable wireless telephone unit 122 can be surely supplied with electric power an amount of which satisfies a regulation required for a cellular telephone.

For this reason, this portable wireless telephone unit 122 is completely deactivated when the battery voltage is lowered down to the predetermined low-voltage detecting level so as to disable its transmitting function even if it can be still used as a cordless telephone. Therefore, there was a problem such that the portable wireless telephone unit cannot be used once the low-voltage detecting signal is generated even if the remaining battery voltage is still sufficient enough for activating a cordless telephone mode.

SUMMARY OF THE INVENTION

The present invention has a purpose, in view of above-described problems or disadvantages encountered in the prior art, to provide a portable wireless telephone apparatus capable of being used as a cordless telephone when a battery energy is reduced down to an inoperative level for a cellular telephone mode, as long as the remaining battery energy is sufficient large enough for operating the portable wireless telephone in the cordless mode.

In order to accomplish above purpose, a first aspect of the present invention provides a portable wireless telephone comprising: an antenna; a cellular transmit/receive means connected to the antenna for transmitting data to or receiving data from a cellular base station; a cordless transmit/receive means connected to the antenna for transmitting data to or receiving data from a base unit of a cordless telephone; a mode selecting means for selecting an operation mode of the portable wireless telephone between a cellular mode and a cordless mode; a battery; a battery condition detecting means connected to the battery for generating a detecting signal if battery condition is not sufficient enough to operate the portable wireless telephone in the cellular mode; a display means; a control means; and the control means controlling the display means to generate a warning, which indicates that the cellular mode is no longer operative, whenever the voltage detecting means generates the detecting signal when the portable wireless telephone is operated in the cellular mode, and for further controlling the mode selecting means to prevent selection of the cellular mode while permitting selection of the cordless mode as long as the battery condition is large enough to operate the portable wireless telephone in the cordless mode.

Furthermore, a second aspect of the present invention provides a portable wireless telephone comprising: an antenna; a cellular transmit/receive means connected to the antenna for transmitting data to or receiving data from a cellular base station; a cordless transmit/receive means connected to the antenna for transmitting data to or receiving data from a base unit of a cordless telephone; a mode selecting means for selecting an operation mode of the portable wireless telephone between a cellular mode and a cordless mode; a battery; a first charge condition detecting means connected to the battery for generating a first charge signal if a battery charging condition is not sufficient enough to operate the portable wireless telephone in the cellular mode; a second charge condition detecting means connected to the battery for generating a second charge signal if the battery charging condition is not sufficient enough to operate the portable wireless telephone in the cordless mode; a display means; and a control means, wherein the control means controls the display means to generate a first warning, which indicates that only the cellular mode is no longer operative, whenever the first charge condition detecting means generates the first charge signal, and further controls the display means to generate a second warning, which indicates that all the modes are no longer operative, whenever the second charge condition detecting means generates the second charge signal.

Moreover, a third aspect of the present invention provides a portable wireless telephone comprising: an antenna; a cellular transmit/receive means connected to the antenna for transmitting data to or receiving data from a cellular base station; a cordless transmit/receive means connected to the antenna for transmitting data to or receiving data from a base unit of a cordless telephone; a mode selecting means for selecting an operation mode of the portable wireless telephone between a cellular mode and a cordless mode; a battery; a micro computer accommodating a counter and memorizing a first charge count required for operating the portable wireless telephone in the cellular mode and a second charge count required for operating the portable wireless telephone in the cordless telephone, so that the first and second charge counts can be used as reference values when checking a remaining energy of the battery; and a display means, wherein the micro computer causing the counter to count a value equivalent to electric current charged into or discharged from the battery and comparing a present count value of the counter with the first charge count, so that the micro computer controls the display means to generate a warning for not operating the cellular mode if the remaining energy of the battery is not sufficient enough to operate the portable wireless telephone in the cellular mode, and further comparing the present count value of the counter with the second charge count, so that the micro computer controls the display means to generate a warning for not operating the cordless mode if the remaining energy of the battery is not sufficient enough to operate the portable wireless telephone in the cordless mode.

According to the third aspect above described, it is preferable that the micro computer controls the mode selecting means not to select the cellular mode when the remaining energy of the battery is lower than the first charge count, and not to select the cordless mode when the remaining energy is lower than the second charge count. Still further, it is preferable that the counter renews its count value periodically by adding a first value in response to charge current supplied to the battery and subtracting a second value in response to discharge current discharged from the battery, wherein the second value is differentiated in accordance with the operation mode of the portable wireless telephone.

With above-described constitution, a portable wireless telephone apparatus in accordance with the present invention can be still used as a cordless telephone after a battery energy is reduced down to an inoperative level as a cellular telephone mode, as long as the remaining battery energy is sufficient large enough for operating the portable wireless telephone as a cordless telephone.

BRIEF DESCRIPTION OF THE DRAWINGS

The above and other objects, features and advantages of the present invention will become more apparent from the following detailed description which is to be read in conjunction with the accompanying drawings, wherein.

DETAILED DESCRIPTION OF THE PREFERRED EMBODIMENTS

Hereinafter, referring now to the accompanying drawings, preferred embodiments of the present invention are explained in detail.

First Embodiment

Figure 1:
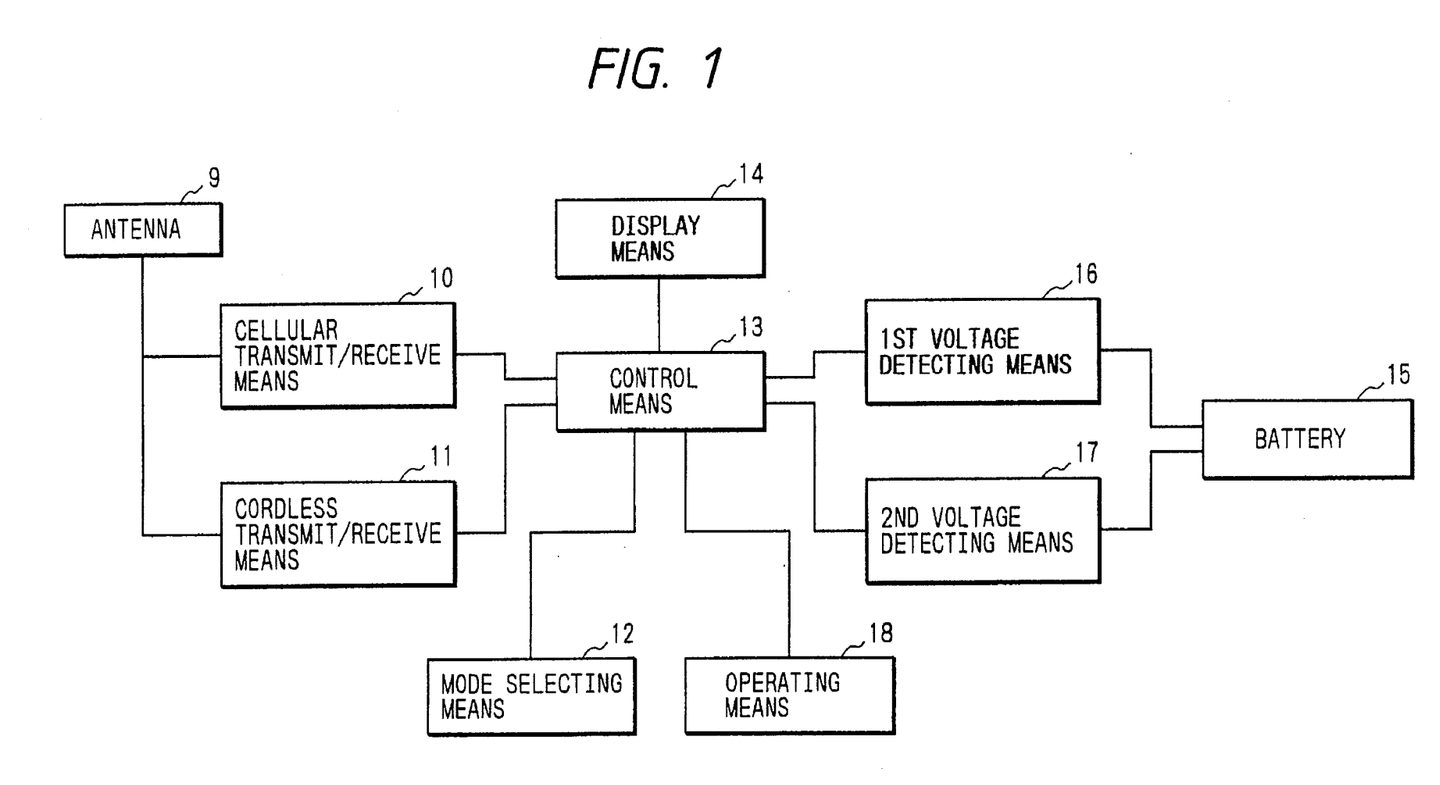
FIG. 1 is a schematic block diagram showing characteristic features and functions of a portable wireless telephone apparatus in accordance with a first embodiment of the present invention.

FIG. 1 is a schematic block diagram showing characteristic features and functions of a portable wireless telephone apparatus in accordance with the first embodiment of the present invention.

In FIG. 1, a reference numeral 9 denotes an antenna, and a reference numeral 10 denotes a cellular transmit/receive means which communicates with a cellular base station through a cellular radio channel. That is, the cellular transmit/receive means 10 transmits radio signals to or receives radio signals from the cellular base station. A reference numeral 11 denotes a cordless transmit/receive means which communicates with a base unit of a cordless telephone through a cordless radio channel. That is, the cordless transmit/receive means 11 transmits radio signals to or receives radio signals from the base unit of the cordless telephone.

A reference numeral 12 denotes a mode selecting means constituted by switches for selecting an operational mode between a cellular mode and a cordless mode. A reference numeral 13 denotes a control means constituted by a micro computer for controlling the apparatus to function as a cellular telephone by using the cellular transmit/receive means 10 in the case where the mode selecting means 12 selects a cellular mode and further controlling the apparatus to function as a cordless telephone by using the cordless transmit/receive means 11 in the case where the mode selecting means 12 selects a cordless mode.

A reference numeral 14 denotes a display means for indicating various information including warning to the user in both of cellular and cordless modes. A reference numeral 15 denotes a battery for supplying electric power to the portable wireless telephone. Usually, a rechargeable Ni-Cd battery is suitable for this battery 15.

A reference numeral 16 denotes a first voltage detecting means for outputting a first low-voltage detecting signal to the control means 13 when a remaining voltage of the battery 15 is reduced down to an inoperative level as a cellular telephone. And, a reference numeral 17 denotes a second voltage detecting means for outputting a second low-voltage detecting signal to the control means 13 when the remaining voltage of the battery 15 is reduced down to an inoperative level as a cordless telephone. Furthermore, a reference numeral 18 denotes an operating means for allowing the user to operate various functions.

Hereinafter, an operation of the above-described portable wireless telephone is explained in detail. When the user wants to use this portable wireless telephone unit as a cellular telephone, the mode selecting means 12 is operated to select a cellular mode.

In response to the selection of the cellular mode, the control means 13 controls the cellular transmit/receive means 10 to receive data sent from the cellular base station so that the cellular transmit/receive means 10 is situated in a waiting condition for receiving a slave signal from the cellular telephone network. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

On the other hand, in calling or waiting condition, the first voltage detecting means 16 monitors the voltage of the battery 15. When the first voltage detecting means 16 detects that the battery voltage is reduced down to an inoperative level as a cellular telephone, the first low-voltage detecting signal is outputted.

When the control means 13 receives the first low-voltage detecting signal, the control means 13 controls the display means 14 to generate a warning to indicate that the battery is required to charge or the cellular mode is inoperative. Furthermore, in the case of a calling condition, the telephone call is forcibly ended. Moreover, the mode selecting means 12 is controlled to no longer select the cellular mode.

When the user wants to use this portable wireless telephone unit as a cordless telephone, the mode selecting means 12 is operated to select a cordless mode. In response to the selection of the cordless mode, the control means 13 controls the cordless transmit/receive means 11 to be situated in a waiting condition for receiving a slave signal sent from the base unit of the cordless telephone. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

On the other hand, in such a calling or waiting condition, the second voltage detecting means 17 monitors the voltage of the battery 15. When the second voltage detecting means 17 detects that the battery voltage is further reduced down to an inoperative level as a cordless telephone, the second low-voltage detecting signal is outputted.

When the control means 13 receives the second low-voltage detecting signal, the control means 13 controls the display means 14 to generate a warning to indicate that the battery is required to charge or the cordless mode is inoperative. Furthermore, in the case of a calling condition, the telephone call is forcibly ended. Moreover, the mode selecting means 12 is controlled not to select any of both the cellular mode and the cordless mode.

Figure 2:
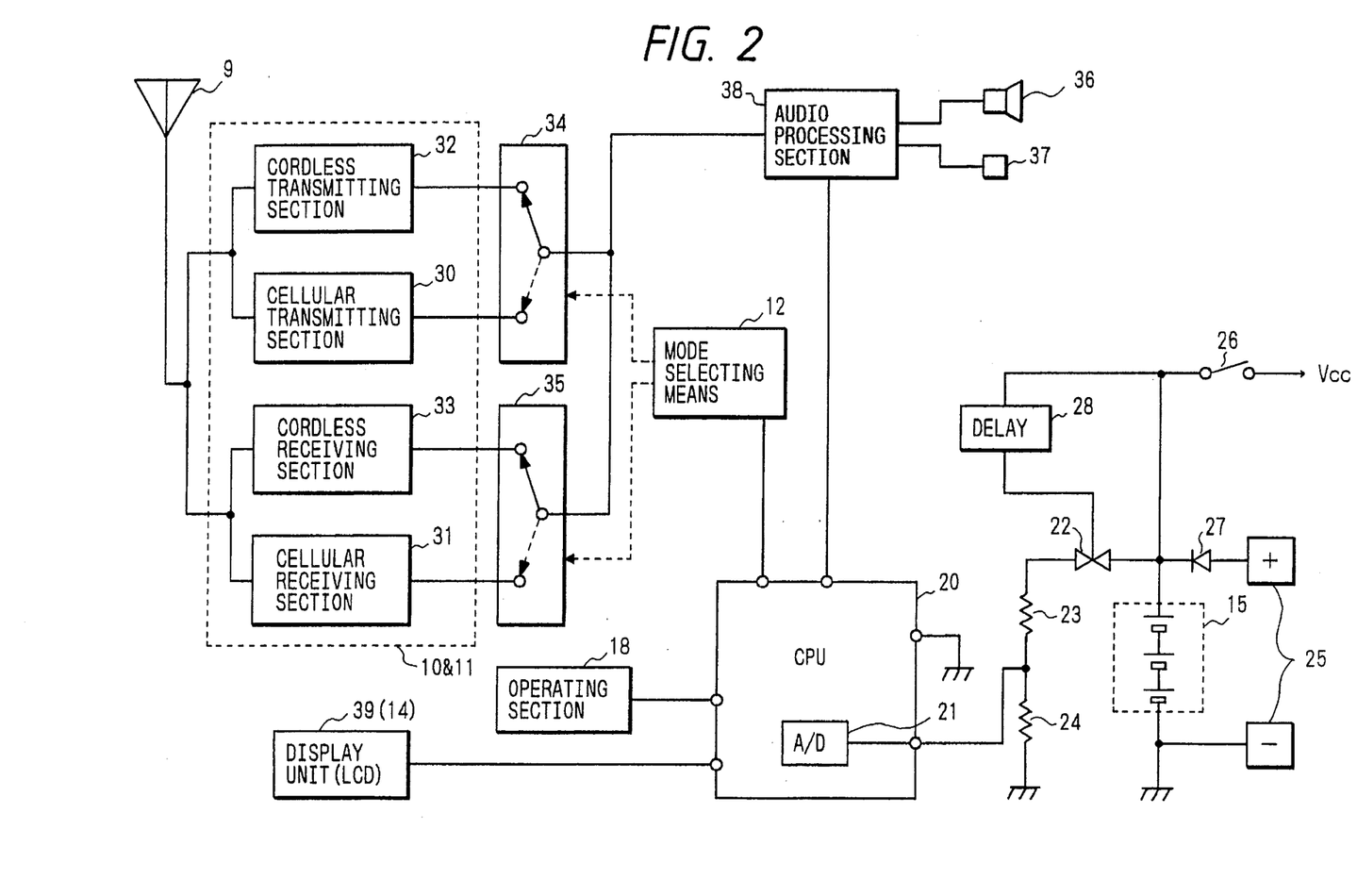
FIG. 2 is a block diagram showing a detailed constitution of the portable wireless telephone apparatus in accordance with the first embodiment of the present invention.
Figure 3:
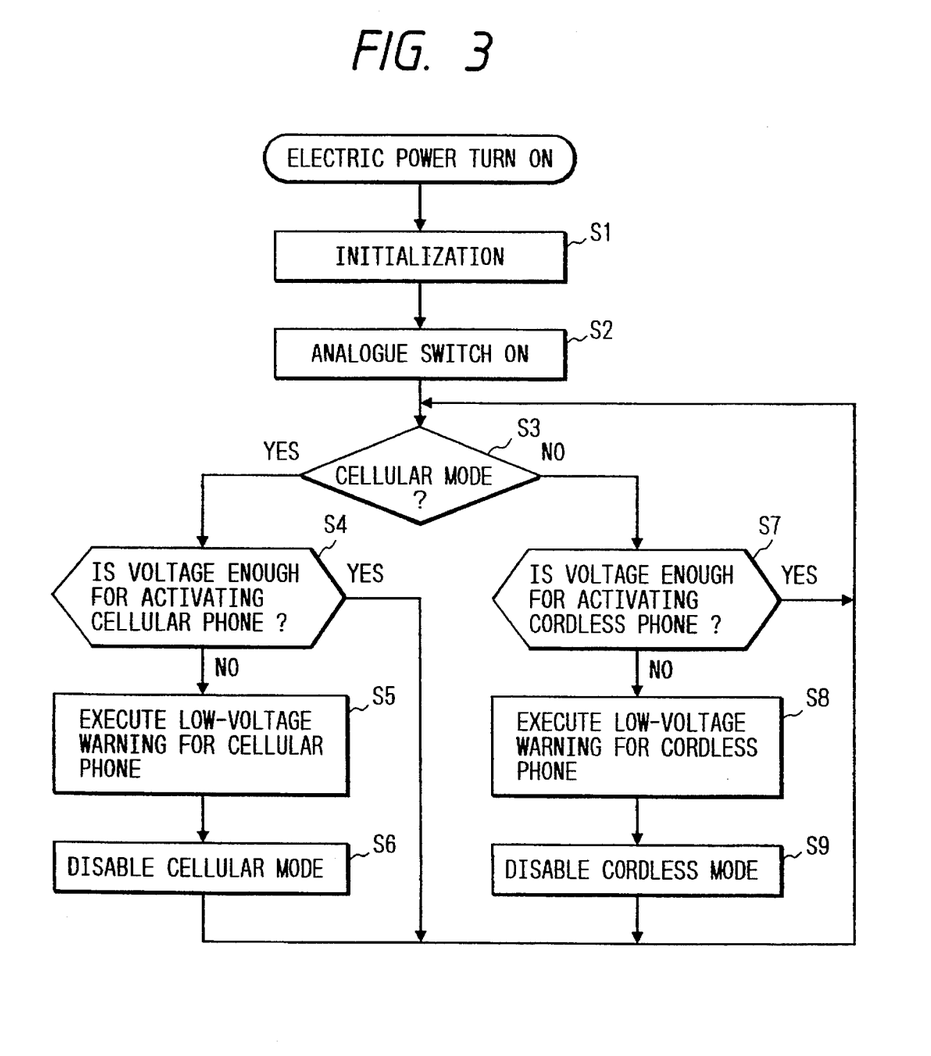
FIG. 3 is a flow chart showing a control procedure of a control unit in the portable wireless telephone apparatus in accordance with the first embodiment of the present invention.

FIG. 2 is a block diagram showing a detailed constitution of the portable wireless telephone apparatus in accordance with the first embodiment of the present invention. Furthermore, FIG. 3 is a flow chart showing a control procedure of a control unit in the portable wireless telephone apparatus in accordance with the first embodiment of the present invention.

In FIG. 2, a reference numeral 20 denotes a micro computer serving as the control means which accommodates an A/D converter 21 (For example, the micro computer M377032 manufactured by Mitsubishi Electric Co. Ltd.) A reference numeral 22 denotes an analogue switch, and reference numerals 23 and 24 denote voltage dividing resistances.

Reference numerals 25, 25 denote charging terminals of this portable wireless telephone unit, and a reference numeral 26 denotes an electric power switch. When this portable wireless telephone unit is mounted on the base unit of the cordless telephone, these charging terminals 25, 25 are electrically connected with the corresponding charging terminals of the base unit of the cordless telephone. Charging current is supplied from a charger equipped in the base unit through these charging terminals so as to charge the battery 15. A reference numeral 27 denotes a diode for preventing a back-flow of current.

The analogue switch 22 functions to prevent the A/D converter 21 from being latched-up upon the turning-on of the electric power. A reference numeral 28 denotes a delay circuit for turning on the analogue switch 22 when a predetermined time has elapsed after the electric power switch 26 was closed.

A reference numeral 30 denotes a cellular transmitting section, and a reference numeral 31 denotes a cellular receiving section. These cellular transmitting section 30 and the cellular receiving section 31 constitute the above-described cellular transmit/receive means 10.

A reference numeral 32 denotes a cordless transmitting section, and a reference numeral 33 denotes a cordless receiving section. These cordless transmitting section 32 and the cordless receiving section 33 constitute the above-described cordless transmit/receive means 11.

Reference numerals 34 and 35 denote changeover switches which are changed over together in accordance with a signal sent from the mode selecting means 12. A reference numeral 36 denotes a speaker, and a reference numeral 37 denotes a microphone. Further, a reference numeral 38 denotes an audio processing section connected to the speaker 36 and the microphone 37. And, a reference numeral 39 is a liquid crystal display (LCD) unit capable of displaying a decline of the battery voltage or other various information in a written form. This liquid crystal display unit 39 is a specific example of the previously explained display means 14.

When the electric power switch 26 is closed, an electric power voltage from the battery 15 is applied to various units including the micro computer 20. Then, the micro computer 20 initializes ports or interior registers and the like. Subsequently, the analogue switch 22 is turned on and, therefore, the A/D converter 21 is applied with a voltage which is fed by dividing the battery voltage in accordance with a ration of the voltage dividing resistances 23, 24. The A/D converter 21 transforms the inputted voltage into a numerical value (i.e. into a digital value) so that the micro computer 20 can read it.

The micro computer 20 memorizes in advance a first minimum battery voltage required for activating this portable wireless telephone unit as a cellular telephone, and a second minimum battery voltage required for activating this portable wireless telephone unit as a cordless telephone, so as to use these values as reference values when checking the remaining voltage of the battery 15. In this embodiment, the A/D converter 21 in the micro computer 20 and the program shown in FIG. 3 constitute the previously described first voltage detecting means 16 and the second voltage detecting means 17.

For instance, in the case where this portable wireless telephone unit is operated in the cellular mode, the micro computer 20 compares the actual remaining voltage value which is A/D transformed in the A/D converter 21 with the above-described first minimum battery voltage. If the actual remaining battery voltage is lower than the first minimum battery voltage, the micro computer 20 controls the display unit 39 to generate a warning of a low-voltage as a cellular mode.

On the other hand, in the case where this portable wireless telephone unit is operated in the cordless mode, the micro computer 20 compares the actual remaining voltage value which is A/D transformed in the A/D converter 21 with the above-described second minimum battery voltage. If the actual battery voltage is lower than the second minimum battery voltage, the micro computer 20 controls the display unit 39 to generate a warning of a low-voltage as both cellular and cordless modes.

In general, electric power consumption as a cordless telephone is smaller than electric power consumption as a cellular telephone. Accordingly, the second minimum battery voltage which corresponds to a minimum voltage enabling this portable wireless telephone unit to work as a cordless telephone is set lower than the first minimum battery voltage which corresponds to a minimum voltage enabling this portable wireless telephone unit to work as a cellular telephone.

FIG. 3 is a flow chart showing a control procedure of a control means 13 in the portable wireless telephone apparatus in accordance with above-described first embodiment of the present invention. Hereinafter, with reference to this flow chart, its operation can be explained as follows.

When an electric power is turned on, first of all ports or registers are initialized in a step S1. Next, in a step S2, the analogue switch 22 shown in FIG. 2 is closed. Then, the battery voltage is inputted into the A/D converter 21.

In a step S3, it is judged whether or not the mode is the cellular mode. If the judgement in the step S3 is YES, the micro computer 20 proceeds to a step S4. To the contrary, if the judgement in the step S3 is NO (i.e. if the mode is the cordless mode), the micro computer 20 proceeds to a step S7.

In the step S4, it is further checked whether or not the battery voltage inputted by being A/D converted is large enough to activate the portable wireless telephone unit as a cellular telephone. If the judgement in the step S4 is NO, the micro computer 20 proceeds to a step S5. In the step S5, the micro computer 20 controls the LCD unit 39 to generate a low-voltage warning for a cellular telephone mode.

Subsequently, in a step S6, the micro computer 20 controls the mode selecting means 12 to prevent the portable wireless telephone unit from being used as a cellular telephone unless this portable wireless telephone unit is charged again up to an adequate voltage for activating it as a cellular telephone.

If the judgement in the step S4 is YES, the micro computer 20 returns to the step S3 as shown in the flow chart.

Similarly, in the step S7, it is further checked whether or not the battery voltage inputted by being A/D converted is large enough to activate the portable wireless telephone unit as a cordless telephone. If the judgement in the step S7 is NO, the micro computer 20 proceeds to a step S8. In the step S8, the micro computer 20 controls the LCD unit 39 to generate a low-voltage warning for a cordless telephone mode.

Subsequently, in a step S9, the micro computer 20 controls the mode selecting means 12 to prevent the portable wireless telephone unit from being used as a cordless telephone unless this portable wireless telephone unit is charged again up to an adequate voltage for activating it as a cordless telephone. Since the minimum battery voltage required for activating the cordless telephone is lower than that of the cellular telephone, all the modes (i.e. the cellular mode and the cordless mode) are disabled by the control carried out in accordance with the step S9. If the judgement in the step S7 is YES, the micro computer 20 returns to the step S3 as shown in the flow chart.

Second Embodiment

Figure 6:
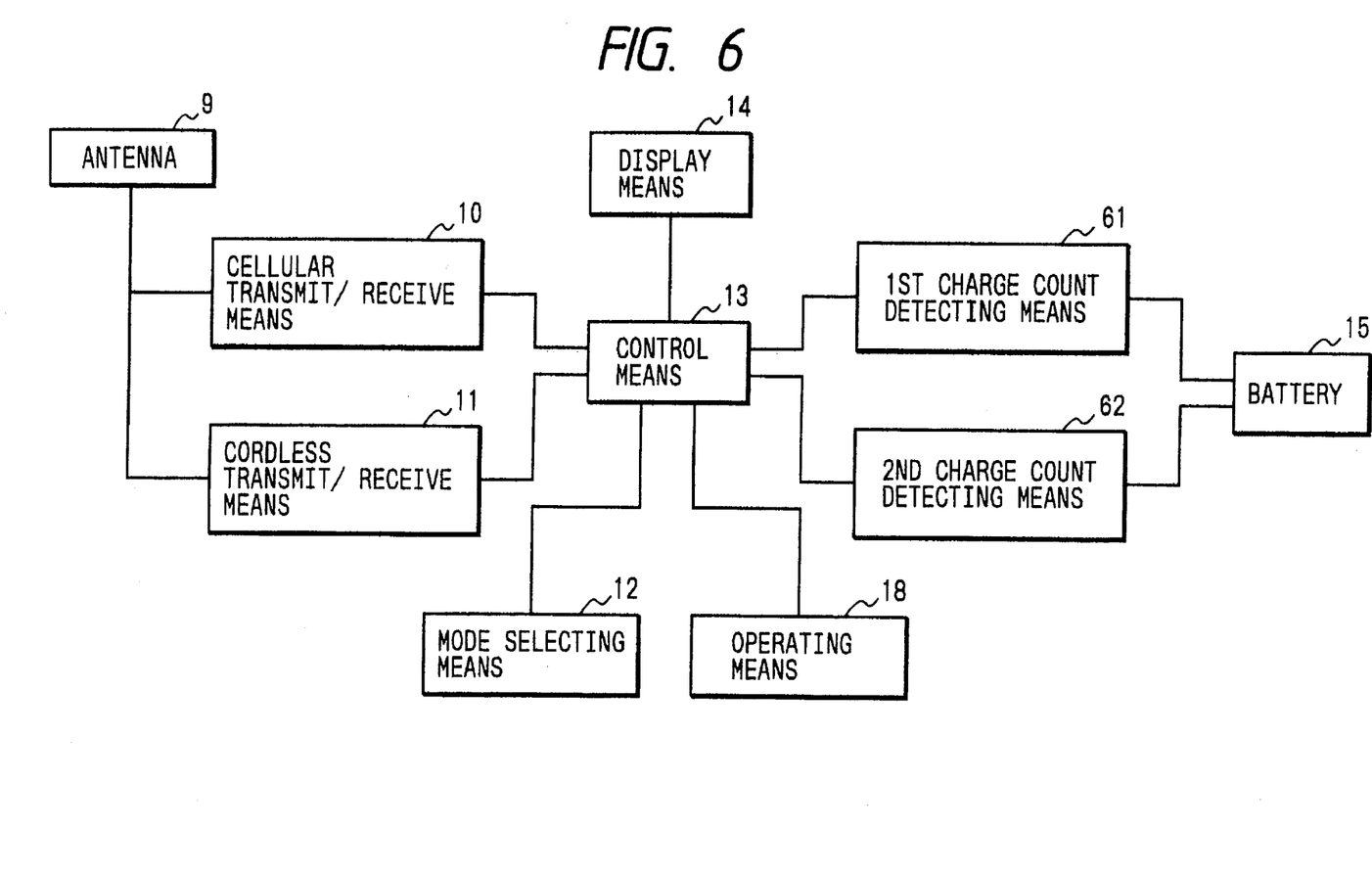
FIG. 6 is a schematic block diagram showing characteristic features and functions of a portable wireless telephone apparatus in accordance with a second embodiment of the present invention.

Hereinafter the second embodiment of the present invention will be explained with reference to FIGS. 6 through 10. FIG. 6 is a schematic block diagram showing characteristic features and functions of a portable wireless telephone apparatus in accordance with the second embodiment of the present invention. In FIG. 6, a reference numeral 61 denotes a first charge count detecting means for outputting a first low-count detecting signal to the control means 13 when a condition of the battery 15 is in an inoperative level as a cellular telephone. And, a reference numeral 62 denotes a second charge count detecting means for outputting a second low-count detecting signal to the control means 13 when the condition of the battery 15 is in an inoperative level as a cordless telephone. In this drawing, identical elements as those disclosed in FIG. 1 are denoted by identical reference numbers.

Hereinafter, an operation of the above-described portable wireless telephone in accordance with the second embodiment of the present invention will be explained in greater detail. When the user wants to use this portable wireless telephone unit as a cellular telephone, the mode selecting means 12 is operated to select a cellular mode.

In response to the selection of the cellular mode, the control means 13 controls the cellular transmit/receive means 10 to receive data sent from the cellular base station so that the cellular transmit/receive means 10 is situated in a waiting condition for receiving a slave signal from the cellular telephone network. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

On the other hand, in such a calling or waiting condition, the first charge count detecting means 61 monitors the charge count for the battery 15. When the first charge count detecting means 61 detects a condition that the battery is in an inoperative level as a cellular telephone, the first low-count detecting signal is outputted.

When the control means 13 receives the first low-count detecting signal, the control means 13 controls the display means 14 to generate a warning to indicate that the battery is required to charge or the cellular mode is inoperative. Furthermore, in the case of a calling condition, the telephone call is forcibly ended. Moreover, the mode selecting means 12 is controlled to no longer select the cellular mode.

When the user wants to use this portable wireless telephone unit as a cordless telephone, the mode selecting means 12 is operated to select a cordless mode. In response to the selection of the cordless mode, the control means 13 controls the cordless transmit/receive means 11 to be situated in a waiting condition for receiving a slave signal sent from the base unit of the cordless telephone. Moreover, in this waiting condition, the user can place a telephone call by manipulating the operating means 18.

If the slave signal is received or the user places the telephone call, the control means 13 carries out a series of protocol sequence through the cellular radio channel to situate a calling condition.

Meanwhile, in such a calling or waiting condition, the second charge count detecting means 62 monitors the charge count for the battery 15. When the second charge count detecting means 62 detects that the battery is in an inoperative level as a cordless telephone, the second lowcount detecting signal is outputted.

When the control means 13 receives the second low-count detecting signal, the control means 13 controls the display means 14 to generate a warning to indicate that the battery is required to charge or the cordless mode is inoperative. Furthermore, in the case of a calling condition, the telephone call is forcibly ended. Moreover, the mode selecting means 12 is controlled not to select any of both the cellular mode and the cordless mode.

Figure 7:
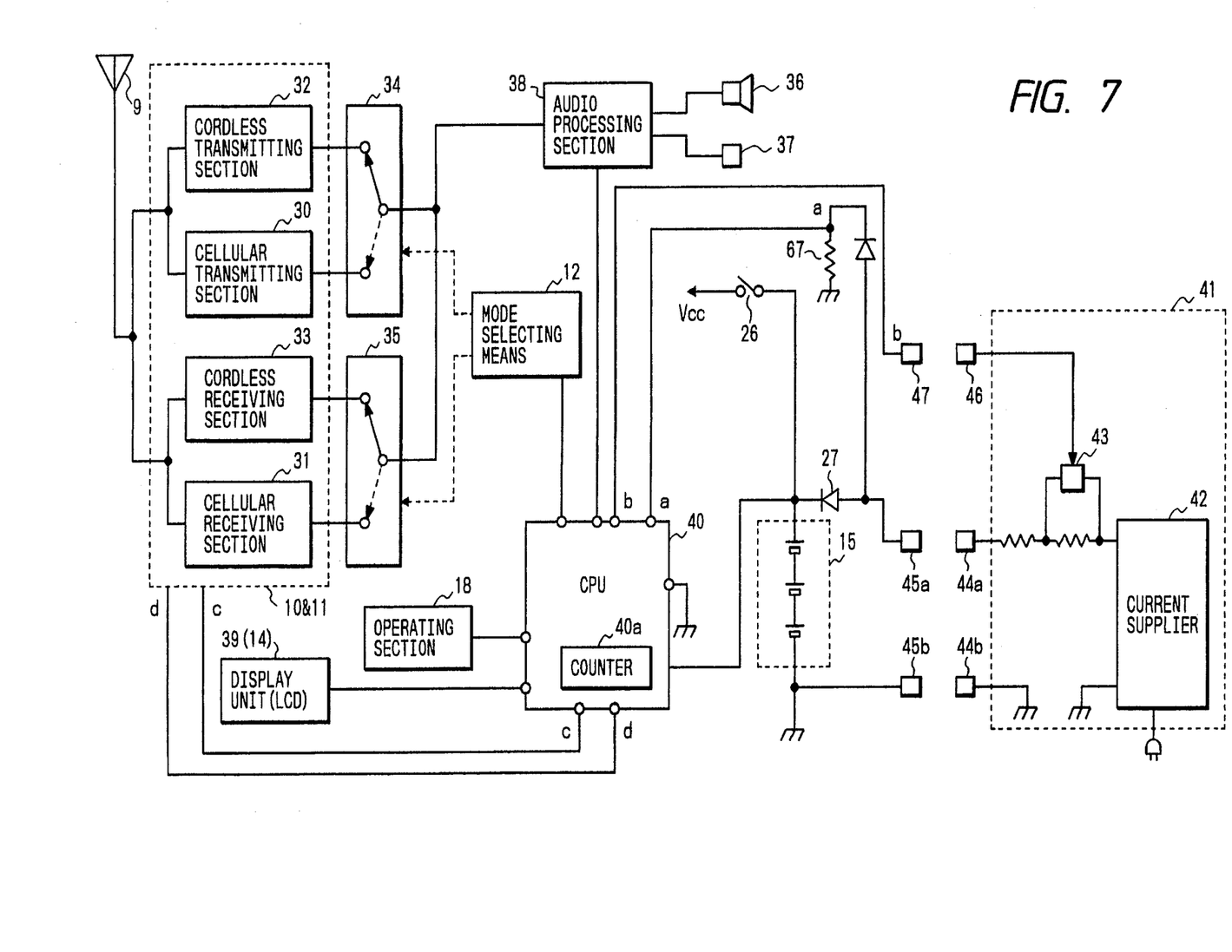
FIG. 7 is a block diagram showing a detailed constitution of the portable wireless telephone apparatus in accordance with the second embodiment of the present invention.
Figure 8:
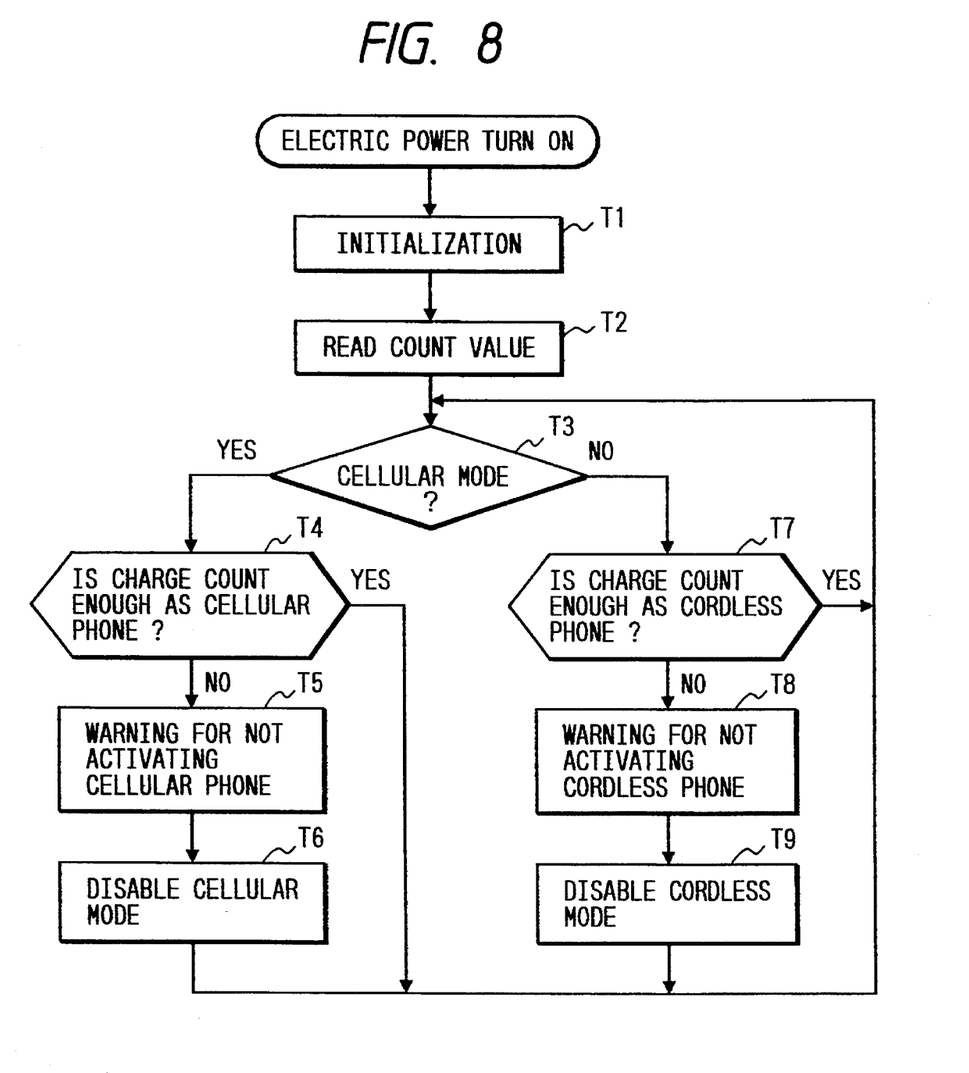
FIG. 8 is a flow chart showing a control procedure of a control unit in the portable wireless telephone apparatus in accordance with the second embodiment of the present invention.

FIG. 7 is a block diagram showing a detailed constitution of the portable wireless telephone apparatus in accordance with the second embodiment of the present invention. Furthermore, FIG. 8 is a flow chart showing a control procedure of a control unit in the portable wireless telephone apparatus in accordance with the second embodiment of the present invention.

In FIG. 7, a reference numeral 41 denotes a charging equipment which charges the battery 15 of the portable wireless telephone. The charging equipment 41 includes a charge current supplier 42 which supplies charge current and an electronic switch 43 which changes the value of charge current. Reference numerals 44a and 44b are charging terminals of the charging equipment 41, which are detachably coupled with charging terminals 45a and 45b of the portable wireless telephone. When the portable wireless telephone is placed on the charging equipment 41 in position for charging electric energy, the charging terminals 44a and 44b are electrically connected with their mating terminals 45a and 45b, respectively. Reference numerals 46 and 47 are terminals for transmitting a charge current switching signal. The charge current switching signal is sent from the electronic switch 43 to a micro computer 40 which includes a counter 40a and serves as a control means like the micro computer 20 in the first embodiment. A reference numeral 67 denotes a resistance. Identical components as those disclosed in FIG. 2 are denoted by identical reference numbers, and will no more be explained.

Hereinafter, an operation of the above-described portable wireless telephone in accordance with the second embodiment of the present invention will be explained in greater detail.

The micro computer 40 memorizes in advance a first reference charge count which is equivalent to a minimum battery energy required for activating this portable wireless telephone unit as a cellular telephone, and a second reference charge count required for activating this portable wireless telephone unit as a cordless telephone, so as to use these reference values when checking the energy condition of the battery 15. In this second embodiment, the counter 40a in the micro computer 40 and the program shown in FIG. 8 constitute the previously described first charge count detecting means 61 and the second charge count detecting means 62.

For instance, in the case where this portable wireless telephone unit is operated in the cellular mode, the micro computer 40 compares the count value of the counter 40a with the above-described first reference charge count. If the count value of the counter 40a is smaller than the first reference charge count, the micro computer 40 controls the display unit 39 to generate a warning of inoperative condition as a cellular mode.

On the other hand, in the case where this portable wireless telephone unit is operated in the cordless mode, the micro computer 40 compares the count value of the counter 40a with the above-described second reference charge count. If the count value of the counter 40a is smaller than the second reference charge count, the micro computer 40 controls the display unit 39 to generate a warning of inoperative condition as both cellular and cordless modes.

As described previously, electric power consumption as a cordless telephone is smaller than the electric power consumption as a cellular telephone. Accordingly, the second reference charge count which corresponds to a minimum charge count enabling this portable wireless telephone unit to work as a cordless telephone is set smaller than the first reference charge count which corresponds to a minimum charge count enabling this portable wireless telephone unit to work as a cellular telephone.

FIG. 8 is a flow chart showing a control procedure of a control means 13 in the portable wireless telephone apparatus in accordance with above-described second embodiment of the present invention. Hereinafter, with reference to this flow chart, its operation can be explained as follows.

When an electric power is turned on, first of all ports or registers are initialized in a step T1. Next, in a step T2, the micro computer 40 reads the count value of the counter 40a stored. The counting operation of the counter 40a will be explained later in more detail with reference to FIGS. 9 and 10. Next, in a step T3, it is judged whether or not the mode is the cellular mode. If the judgement in the step T3 is YES, the micro computer 40 proceeds to a step T4. To the contrary, if the judgement in the step T3 is NO (i.e. if the mode is the cordless mode), the micro computer 40 proceeds to a step T7.

In the step T4, it is further checked whether or not the count value of the counter 40a is large enough to activate the portable wireless telephone unit as a cellular telephone. If the judgement in the step T4 is NO, the micro computer 40 proceeds to a step T5. In the step T5, the micro computer 40 controls the LCD unit 39 to generate a warning for not activating the cellular telephone mode.

Subsequently, in a step T6, the micro computer 40 controls the mode selecting means 12 to prevent the portable wireless telephone unit from being used as a cellular telephone unless this portable wireless telephone unit is charged again up to an adequate condition for activating it as a cellular telephone.

If the judgement in the step S4 is YES, the micro computer 40 returns to the step T3 as shown in the flow chart.

Similarly, in the step T7, it is further checked whether or not the count value of the counter 40a is large enough to activate the portable wireless telephone unit as a cordless telephone. If the judgement in the step T7 is NO, the micro computer 40 proceeds to a step T8. In the step T8, the micro computer 40 controls the LCD unit 39 to generate a warning for not activating the cordless telephone mode.

Subsequently, in a step T9, the micro computer 40 controls the mode selecting means 12 to prevent the portable wireless telephone unit from being used as a cordless telephone unless this portable wireless telephone unit is charged again up to an adequate condition for activating it as a cordless telephone. Since the charge count required for activating the cordless telephone is lower than that of the cellular telephone, all the modes (i.e. the cellular mode and the cordless mode) are disabled by the control carried out in accordance with the step T9. If the judgement in the step T7 is YES, the micro computer 40 returns to the step T3 as shown in the flow chart.

Figure 9:
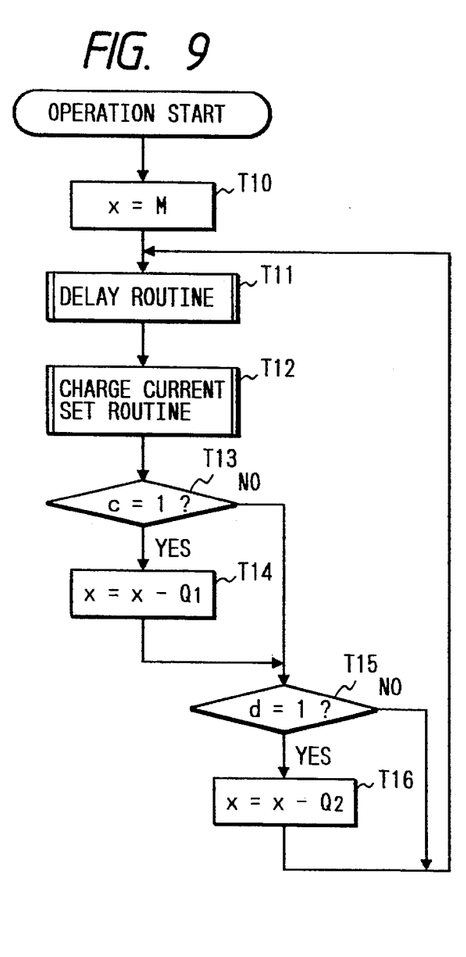
FIG. 9 is a flow chart showing a counting operation of a counter in the control unit in accordance with the second embodiment of the present invention.
Figure 10:
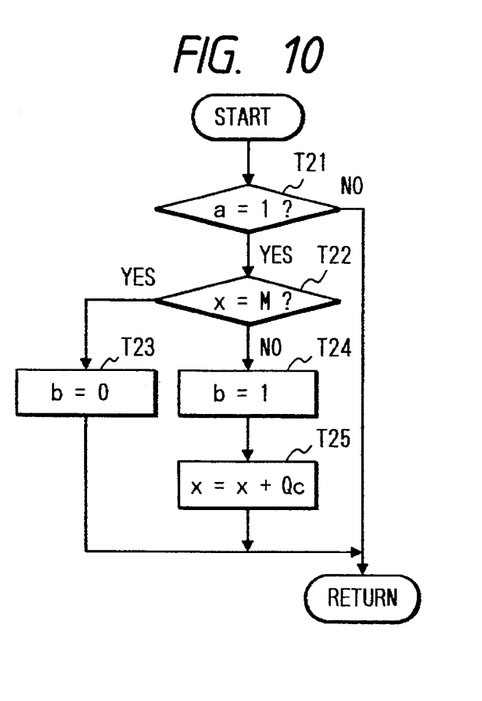
FIG. 10 is a flow chart showing details of a charge current set routine in accordance with the second embodiment of the present invention.

FIG. 9 is a flow chart showing a counting operation of the counter 40a in the micro computer 40 in accordance with the second embodiment of the present invention. FIG. 10 is a flow chart showing details of a charge current set routine in accordance with the second embodiment of the present invention.

In these flow charts, "x" represents a present value of the counter 40a. The counter 40a basically adds its count value by an amount corresponding to a charge current value when the battery 15 is charged, and subtracts its value by an amount corresponding to a discharge current value when the battery 15 is discharged. Thus, the present value "x" of the counter 40a is equivalent to the remaining energy of the battery 15. A reference character "Q1" represents a value corresponding to a discharge current when the portable wireless telephone unit is working as a cordless phone, while a reference character "Q2" represents a value corresponding to a discharge current when the portable wireless telephone unit is operating as a cellular phone. As electric power consumption of the battery 15 is larger when the portable wireless phone unit is working as a cellular telephone than that in the cordless mode, the value "Q2" is larger than the value of "Q1".

A reference character "Q2" represents a value corresponding to a quick charge current to be supplied to the battery 15. A reference character "M" represents a value corresponding to the full capacity of the battery 15 and predetermined in advance in accordance with the charging capacity of the battery 15. When the present value of the counter 40a is equal with the value "M", the micro computer judges this condition means that charging of the battery 15 is completed.

A flag "a" represents the presence of charge current to the battery 15. When the charge equipment 41 applies a charging voltage, the battery 15 receives charge current. This charge current also flows through the resistance 67; thus the resistance 67 generates a significant voltage, turning the value of the flag "a" into "1". When the resistance 67 generates no voltage, the value of the flag "a" is "0".

A flag "b" represents the control data to be fed to the electronic switch 43. When the electronic switch 43 receives a control data of b=1, the electronic switch 43 is short-circuited. On the contrary, when the electronic switch 43 receives a control data of b=0, the electronic switch 43 is opened.

A flag "c" represents that the portable wireless telephone unit is working as a cordless phone. When the portable wireless telephone unit is in the cordless mode, the flag "c" is turned into "1". Otherwise the value of the flag "c" is "0".

A flag "d" represents that the portable wireless telephone unit is working as a cellular phone. When the portable wireless telephone unit is in the cellular mode, the flag "d" is turned into "1". Otherwise the value of the flag "d" is "0".

In the flow chart of FIG. 9, after the micro computer 40 starts the operation, the micro computer 40 proceeds to a step T10 wherein a value stored as the value of "x" is "M" indicating the fully charged condition of the battery 15. Because of difficulty of detecting a correct value corresponding the remaining energy of the battery 15 in the very beginning just after the micro computer 40 starts the operation, the micro computer 40 presumes that the battery 15 is in a fully charged condition even if the fact is that the battery 15 is not yet charged completely, thereby avoiding unexpected quick charging of the battery 15.

Next, the micro computer 40 proceeds to a step T11 to execute a delay routine wherein the micro computer 40 waits the elapse of a predetermined time T (sec). Thereafter, the micro computer proceeds to a step T12 to enter a charge current set routine.

FIG. 10 shows the details of the charge current set routine. First of all, a judgement is made in a step T21 as to whether the charge current is now being supplied or not. When the portable wireless telephone unit is disengaged from the charging equipment 41 or electric power is not given to the charging equipment 41, the flag "a" is "0". Thus, the micro computer 40 returns to the main routine of FIG. 8 without doing any charge current setting.

On the contrary, when the charge current is flowing, the flag "a" is "1". Thus, the micro computer 40 proceeds to a step T22 wherein it is judged whether or not the present value "x" of the counter 40a is identical with "M" If the "x" equals "M", the micro computer 40 proceeds to a step T23 to set the flag "b" to "0" so that the electronic switch 43 is opened for the execution of floating charge. On the other hand, if the "x" is not equal to "M" in the step T22, the micro computer 40 proceeds to a step T24 to set the flag "b" to "1" so that the electronic switch 43 is short-circuited for the execution of quick charge. Subsequently, the micro computer 40 proceeds to a step T25 to renew "x" by adding "Qc" Then, the micro computer 40 returns to the main routine of FIG. 8.

In the main routine, the micro computer 40 proceeds to a step T13 wherein a judgement is made to find the operation mode of the portable wireless telephone unit by checking whether the flag "c" is "1" or not. When the portable wireless telephone unit is working as a cordless telephone, the flag "c" is "1"; therefore the micro computer 40 proceeds to a step T14 to renew "x" by subtracting "Q1". On the contrary, when the judgement is "NO" in the step T13, the micro computer proceeds to a step T15 wherein it is judged whether the flag "d" is "1" or not. When the portable wireless telephone unit is working as a cellular telephone, the flag "d" is "1"; therefore the micro computer 40 proceeds to a step T16 to renew "x" by subtracting "Q2". Thereafter, the micro computer returns to the step T11 and repeats the same procedure of the steps T11 through T16.

In this manner, the second embodiment repeatedly and periodically executes addition and subtraction of the value "x". More specifically, "x" is subtracted by the value "Qi" or "Q2" corresponding to the discharge current or added the value "x" with the value "Qc" corresponding to the charge current every T seconds. Thus, the value of "x" accurately represents the remaining energy (i.e. electric charge) stored in the battery 15. For example, when the portable wireless telephone unit starts the cellular mode operation from the fully charged condition of x=M, the cellular mode operation continued for 30T seconds will reduce the value of "x" to "M-30 Q2".

As apparent from the foregoing description, the second embodiment of the present invention utilizes the counter 40a provided in the control means 40 for accurately detecting the remaining energy condition of the battery 15. Thus, it becomes possible to make a judgement as to whether the portable wireless telephone unit is operable as a cellular telephone or a cordless telephone.

As this invention may be embodied in several forms without departing from the spirit of essential characteristics thereof, the present embodiments as described are therefore illustrative and not restrictive, since the scope of the invention is defined by the appended claims rather than by the description preceding them, and all changes that fall within the metes and bounds of the claims, or equivalents of such metes and bounds are therefore intended to be embraced by the claims.

What is claimed is:

1. A portable wireless telephone comprising:

an antenna;

a cellular transmit/receive means connected to said antenna for transmitting data to or receiving data from a cellular base station;

a cordless transmit/receive means connected to said antenna for transmitting data to or receiving data from a base unit of a cordless telephone;

a mode selecting means for selecting an operation mode of the portable wireless telephone between a cellular mode and a cordless mode;

a battery;

a battery condition detecting means connected to said battery for generating a detecting signal if battery condition is not sufficient enough to operate the portable wireless telephone in the cellular mode;

a display means;

a control means; and said control means controlling said display means to generate a warning, which indicates that the cellular mode is no longer operative, whenever said battery condition detecting means generates the detecting signal when the portable wireless telephone is operated in the cellular mode, and for further controlling said mode selecting means to prevent selection of the cellular mode while permitting selection of the cordless mode as long as said battery condition is sufficient enough to operate the portable wireless telephone in the cordless mode.

2. A portable wireless telephone comprising:

an antenna;

a cellular transmit/receive means connected to said antenna for transmitting data to or receiving data from a cellular base station;

a cordless transmit/receive means connected to said antenna for transmitting data to or receiving data from a base unit of a cordless telephone;

a mode selecting means for selecting an operation mode of the portable wireless telephone between a cellular mode and a cordless mode;

a battery;

a first charge condition detecting means connected to said battery for generating a first charge signal if a battery charging condition is not sufficient enough to operate the portable wireless telephone in the cellular mode;

a second charge condition detecting means connected to said battery for generating a second charge signal if the battery charging condition is not sufficient enough to operate the portable wireless telephone in the cordless mode;

a display means; and a control means, wherein said control means controls said display means to generate a first warning, which indicates that only the cellular mode is no longer operative, whenever said first charge condition detecting means generates the first charge signal, and further controls said display means to generate a second warning, which indicates that all the modes are no longer operative, whenever said second charge condition detecting means generates the second charge signal.

3. A portable wireless telephone in accordance with claim 2, wherein said control means further controls said mode selecting means not to select the cellular mode in response to a detection of said first charge signal.

4. A portable wireless telephone in accordance with claim 2, wherein said control means further controls said mode selecting means not to select both the cellular mode and the cordless mode in response to a detection of said second charge signal.

5. A portable wireless telephone comprising:

an antenna;

a cellular transmit/receive means connected to said antenna for transmitting data to or receiving data from a cellular base station;

a cordless transmit/receive means connected to said antenna for transmitting data to or receiving data from a base unit of a cordless telephone;

a mode selecting means for selecting an operation mode of the portable wireless telephone between a cellular mode and a cordless mode;

a battery;

a micro computer accommodating a counter and memorizing a first charge count required for operating the portable wireless telephone in the cellular mode and a second charge count required for operating the portable wireless telephone in the cordless telephone, so that said first and second charge counts can be used as reference values when checking a remaining energy of the battery; and a display means, wherein said micro computer causes said counter to count a value equivalent to electric current charged into or discharged from said battery and compares a present count value of said counter with said first charge count, so that said micro computer controls the display means to generate a warning for not operating the cellular mode if the remaining energy of the battery is not sufficient enough to operate the portable wireless telephone in the cellular mode, and further compares the present count value of said counter with said second charge count, so that said micro computer controls the display means to generate a warning for not operating the cordless mode if the remaining energy of the battery is not sufficient enough to operate the portable wireless telephone in the cordless mode.

6. A portable wireless telephone in accordance with claim 5, wherein said micro computer further controls said mode selecting means not to select the cellular mode when the remaining energy of the battery is lower than the first charge count.

7. A portable wireless telephone in accordance with claim 5, wherein said micro computer further controls said mode selecting means not to select the cordless mode when the remaining energy is lower than the second charge count.

8. A portable wireless telephone in accordance with claim 5, wherein said counter renews its count value periodically by adding a first value in response to charge current supplied to the battery and subtracting a second value in response to discharge current discharged from the battery.

9. A portable wireless telephone in accordance with claim 8, wherein said second value is differentiated in accordance with the operation mode of the portable wireless telephone.

* * * * *